United States Patent
Kleppner (12)

(10) Patent No.: US 6,273,131 B1
(45) Date of Patent: Aug. 14, 2001

(54) DEVICE FOR CONVEYING FUEL FROM A RESERVE POT TO THE INTERNAL COMBUSTION ENGINE OF A MOTOR VEHICLE

(75) Inventor: Stephan Kleppner, Bretten (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 08/920,733

(22) PCT Filed: Aug. 6, 1996

(86) PCT No.: PCT/DE96/01460

§ 371 Date: Aug. 29, 1997

§ 102(e) Date: Aug. 29, 1997

(87) PCT Pub. No.: WO97/24524

PCT Pub. Date: Jul. 10, 1997

(30) Foreign Application Priority Data

Dec. 30, 1995 (DE) .............................................. 195 49 192

(51) Int. Cl.[7] .................................................... F02M 37/04
(52) U.S. Cl. .................... 137/565.22; 137/574; 137/576; 123/514
(58) Field of Search ..................................... 137/549, 550, 137/572, 574, 576, 595, 565.22; 123/514, 516

(56) References Cited

U.S. PATENT DOCUMENTS

| | | | |
|---|---|---|---|
| 1,548,008 | * 7/1925 | Joyce et al. ........................... | 137/550 |
| 1,960,335 | * 5/1934 | Finnie et al. ....................... | 137/549 X |
| 4,397,333 | * 8/1983 | Liba et al. ............................ | 137/574 |
| 4,706,707 | * 11/1987 | Betterton et al. ................... | 137/592 X |
| 4,750,518 | * 6/1988 | Griffin et al. ..................... | 137/574 X |
| 4,842,006 | * 6/1989 | Scheurenbrand et al. ....... | 137/574 X |
| 5,080,077 | * 1/1992 | Sawert et al. ..................... | 137/574 X |
| 5,564,397 | * 10/1996 | Kleppner et al. ..................... | 123/514 |

FOREIGN PATENT DOCUMENTS

| | | |
|---|---|---|
| 41 23 367 A1 | 1/1993 | (DE) . |
| 422498A1 | 2/1994 | (DE) . |
| 2602234 | * 4/1997 | (DE) .................................... 137/574 |

* cited by examiner

*Primary Examiner*—John Rivell
(74) *Attorney, Agent, or Firm*—Michael J. Striker

(57) ABSTRACT

The device for conveying fuel from a fuel tank (10) to an engine (18) of a motor vehicle has a conveying unit (14), communicating on the intake side with the fuel tank (10) and, on the pressurized side, with the engine (18), and a return line (22), which leads to a jet pump (24), located near a tank bottom (11), that pumps excess fuel via a mixing region into a reserve pot (12), from which the conveying unit (14) draws fuel. According to the invention a siphon-like mixing region (29) is provided between the reserve pot (12) and the tank bottom (11). An opening (32) or a filter element (48) is provided in a transitional region (31) of the mixing region (29) to the reserve pot (12). The opening (32) or filter element (48) which extends parallel to the tank bottom is closable by an axially movable closing element (44,51) so that a fuel flow can occur into the reserve pot (12) but not back from the reserve pot (12) into the mixing region (29).

12 Claims, 2 Drawing Sheets

DEVICE FOR CONVEYING FUEL FROM A RESERVE POT TO THE INTERNAL COMBUSTION ENGINE OF A MOTOR VEHICLE

This application is a continuation application of PCT/DE96/01460, now abandoned.

BACKGROUND OF THE INVENTION

1. Field of the Invention

The invention relates to a device for conveying fuel from a fuel tank to the internal combustion engine of a motor vehicle having a conveying unit communicating on the intake side with the fuel tank and on the pressurized side with the engine, and a return line which leads to a jet pump, located near a tank bottom, that pumps the excess fuel via a mixing region into a reserve pot, from which the conveying unit draws fuel.

2. Prior Art

In conveying devices in accordance with German Patent Disclosure DE 42 24 981 A1, with the aid of the jet pump an adequate filling of a reserve pot is to be assured, in which reserve pot the conveying unit is disposed and from which the fuel is fed to the engine. This is intended to assure a fuel reserve for the conveying unit even if the fuel tank is relatively empty, and this reserve assures that even relatively long hill uphill grades, for instance, can be overcome without problems. To fill the reserve pot, in the lower region near the tank bottom a mixing region is provided, by which both fresh fuel from the fuel tank and fuel returning from the engine are delivered to the reserve pot via an aspirating jet pump. In the mixing region near the jet pump, an opening is provided by way of which fresh fuel can enter the mixing region. To prevent the reserve pot from running empty once the engine and hence the conveying unit have been shutoff, this opening has a closing element in the form of a flap or valve plate, which opens whenever the engine is in operation and the jet pump is introducing returned fuel into the mixing region. However, this arrangement has the disadvantage of a complicated arrangement for closing the opening, which moreover requires a large amount of space. In addition, such closing elements, which are located at the inlet to the mixing region, cannot close the opening tightly, so that especially when the engine has been off for some time while the vehicle is parked on a slope, starting is impossible.

SUMMARY OF THE INVENTION

It is an object of the present invention to provide an improved device for conveying fuel from a fuel tank to an internal combustion engine of a motor vehicle, which does not suffer from the above-described disadvantages.

This object and others which will be made more apparent hereinafter are attained in a device for conveying fuel from a fuel tank to the internal combustion engine of a motor vehicle having a conveying unit communicating on the intake side with the fuel tank and on the pressurized side with the engine, and a return line which leads to a jet pump, located near a tank bottom, that pumps the excess fuel via a mixing region into a reserve pot, from which the conveying unit draws fuel.

According to the invention a siphon-like mixing region is provided between the reserve pot and the tank bottom and the siphon-like mixing region is provided with an opening into the reserve pot in a transitional region The opening extends parallel to the tank bottom and is closable with a closing element that is axially movable relative to the opening.

The conveying device according to the invention has the advantage over the prior art of enabling a simple, economical arrangement which enables secure closing of the mixing region with regard to the reserve pot. Shallow installation can moreover be attained as a result, so that in addition a greater tank volume can be made available for holding fuel. Further, because of the siphon-like embodiment of the mixing region, it can be assured that complete evacuation of the reserve pot can be prevented. Thus at least a minimum amount of fuel remains in the reserve pot, and the level of the fuel remaining in the reserve pot can be determined by the size of the siphon-like mixing region.

In a further embodiment of the invention it is provided that a filter element is disposed in the opening in the transitional region. As a result, the dirt entrained with the fresh fuel can be trapped, so that only filtered fuel can reach the reserve pot. This has the advantage that plugging up of the prefilter by the conveying unit can be prevented, and the conveying unit can have a longer service life.

In another advantageous embodiment of the invention, it is provided that the opening in the transitional region has a sealing face. This allows simplification of production and a reduction in the number of components. The closing element can thus rest directly on the sealing face and reliably close the reserve pot and protect it against running empty. Advantageously, the sealing face or sealing element is integrated into the transitional region.

In another advantageous embodiment of the invention, it is provided that the filter element is embodied integrally with the opening, and that the closing element can be disposed in the filter element so as to be axially movable relative to the opening. As a result of this arrangement, the number of components can be reduced further, which also enables cost savings by simplifying assembly. The closing element can simply be inserted into the filter element and fixed relative to the filter element by a clip connection with a plug, so that fast and simple embodiment and assembly can be provided.

In another advantageous embodiment of the invention, it is provided that the opening in the transitional region is closable with a spherical closing element and can be disposed in a cage-like filter element toward the opening. This alternative feature, in comparison with the closing element described above, has the additional advantage of allowing simple, economical design. The cage-like filter element can assume a dual function. First, it secures the positioning of the spherical closing element relative to the opening. Second, the filter element can trap the dirt entrained by the fuel flowing into the reserve pot.

In another advantageous embodiment of the invention, it is provided that a lower edge of the reserve pot is embodied as no higher than a lower edge of the mixing region. As a result it can be assured that the initial filling quantity can flow into the reserve pot.

Advantageous further embodiments of and improvements to the main claim are recited in the further dependent claims.

BRIEF DESCRIPTION OF THE DRAWING

Exemplary embodiments of the invention are shown in the drawing and described in further detail in the ensuing description, wherein.

DESCRIPTION OF THE EXEMPLARY EMBODIMENT

Figure 1:
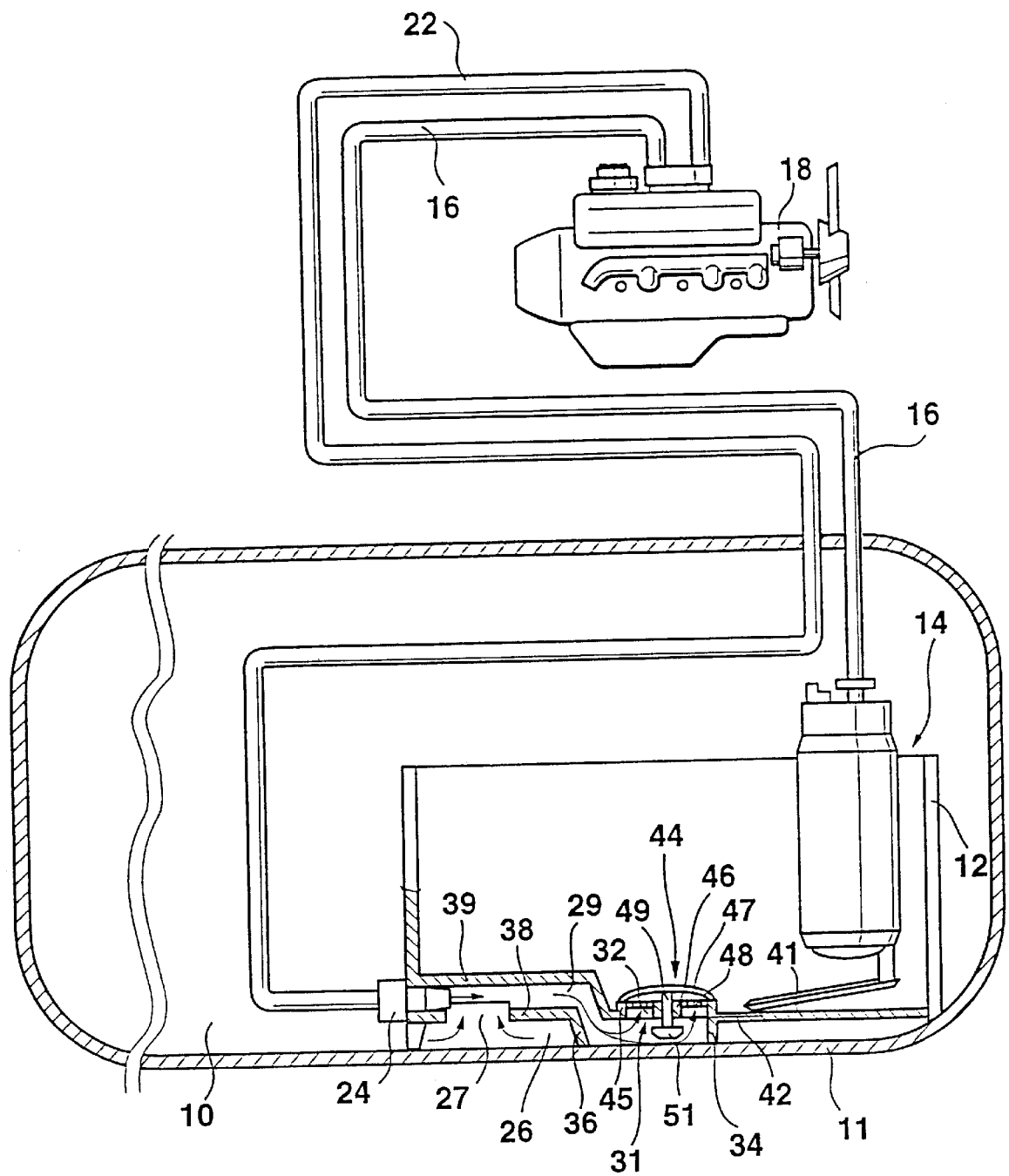
FIG. 1 is a schematic illustration, not to scale, of a conveying device in a fuel tank having a siphon-like mixing region.

A device shown in FIG. 1 for conveying fuel has a fuel tank 10 in whose interior a separate container-like reserve pot 12 is accommodated. The separate reserve pot 12 is embodied in potlike form, and a conveying unit 14, which includes an electrical drive motor and a pump portion accommodated in a common housing, is disposed in this reserve pot 12. The conveying unit 14 aspirates fuel from the reserve pot 12 and forces it via a supply line 16 to the internal combustion engine 18 of a motor vehicle, not shown in detail. A check valve can be accommodated in the supply line 16. Since the conveying unit 14 furnishes more fuel for the engine 18 than the engine can use, a return line 22 carries the excess fuel back into the tank 10. Located at the end of the return line 22 is a jet pump 24, which carries the return-flowing fuel into the reserve pot 12.

In the lower region of the reserve pot 12, near a tank bottom 11, a tank chamber 26 is provided which is open to the fuel tank 10. Via an opening 27, fresh fuel from the reserve pot 12 can reach a mixing region 29. The jet pump 24 is also provided near the opening 27. The excess fuel, which is returned via the return line 22, flows directly into the mixing region 29 and thus aspirates fresh fuel from the tank chamber 26 by the Venturi principle, so that there is a mixture of fresh and returned fuel in the mixing region 29. At the end of the mixing region 29, in terms of the flow direction, an opening 32 is provided in the transitional region 31 between the mixing region 29 and the interior of the reserve pot 12. Through this opening 32, the mixture flows out of the mixing region 29 into the interior of the reserve pot 12.

The mixing region 29 is embodied in siphon-like fashion. In the transitional region 31, wall portions 34 and 36 supported on the tank bottom 11 are provided, which close off the transitional region 31 from the tank bottom 11. The wall portion 36 changes over into a horizontal portion 38, which forms a partition between the mixing region 29 and the tank chamber 26. Extending parallel to it is a bottom wall 39 of the reserve pot 12. As a result of these provisions, the mixing region 29 can be embodied in siphon-like fashion. The bottom wall 39 of the reserve pot 12 is embodied in stepped fashion and has a portion 41 that is located in a plane 42. The partition 38 of the mixing region 29 or of the tank chamber 26 is likewise disposed in this plane 42. As a result, an initial filling can be made possible, and a slight amount of fuel, for instance 5 liters, can reach the reserve pot 12 to allow the conveying unit 14 to start up. It may also be contemplated that the portion 41 be located partly below or above the plane 42.

The fuel mixture in the mixing region 29 reaches the reserve pot 12 via the opening 32, which advantageously is likewise located in the plane 42. This opening 32 is closeable by a closing element 44. The closing element 44 is mushroom-shaped and is received so as to be axially movable via a guide 46 disposed in the opening 32. Because of the mushroom-like, or shallow, or lid-like, embodiment of the closing element 44, the peripheral regions of the closing element 44 can rest on the opening 32. The fuel pressure prevailing as a result of the fuel present in the reserve pot 12 has the effect that the closing element 44 is pressed against the opening 32, and the closing element 44 is disposed in a closing position. Near the peripheral region of the opening 32, a sealing face or sealing element 45 is provided. This element may be in the form of an insert part. Advantageously, however, it is provided that the sealing element 45 is made integral with the peripheral region.

In the opening 32, a filter element 48 is provided, which filters the entrained dirt so that only clean fuel can reach the reserve pot 12, from which it is conveyed to the engine 18 via the conveying unit 14. The filter element 48 may advantageously be embodied integrally with the reserve pot 12. It is equally possible for it to be provided as a separate part inserted into the opening. In its center axis, the filter element 48 has a guide 46, in which a protrusion 49 of the closing element 44, which protrusion receives the cap 47, is received axially movably. Located opposite the cap 47 is a plug 51 that limits the axial stroke of the closing element 44. This closing element advantageously has a stroke travel of approximately 1 to 2 mm. Depending on the application, this travel can be chosen to be greater or lesser.

As soon as the engine 18 is put into operation and the conveying unit 14 builds up a feed pressure in the gasoline injection system, the excess fuel pumped is returned via the return line 22 and reaches the mixing region 29 via the jet pump 24. As already noted, the return fuel is mixed with fresh fuel on the basis of the Venturi principle, whereupon as a result of the return, a pressure builds up in the mixing region 29 whose effect is that the closing element 44 is opened and the fuel mixture can flow into the reserve pot 12.

Figure 2:
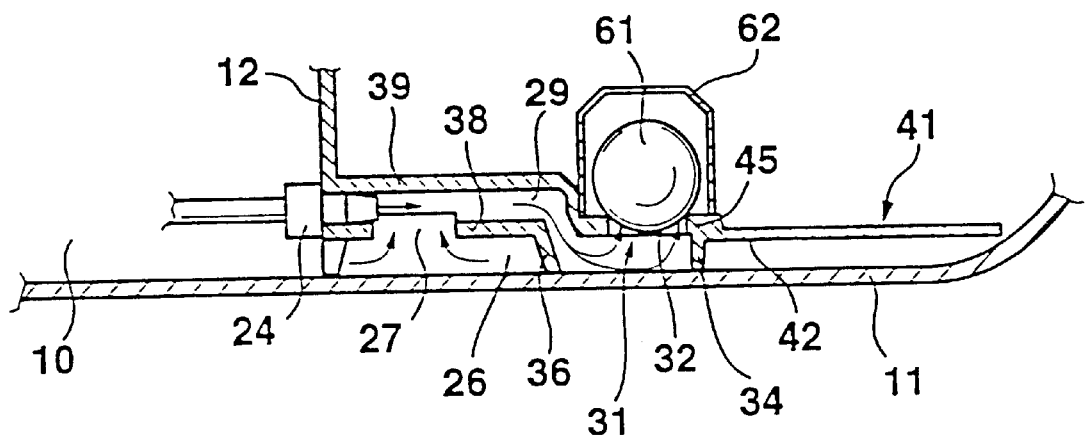
FIG. 2 is an enlarged, schematic, cutaway cross-sectional view of an alternative version of FIG. 1.

FIG. 2 shows an enlarged fragmentary view in cross section of an alternative version of FIG. 1. Only those components differing from FIG. 1 will be described below. The opening 32 is closeable by a ball-shaped closing element 61. This element is held in its position by a cage-like filter element 62 which can be positioned relative to the opening 32. The filter element 62 is embodied in such a way that the spherical closing element 61 can advantageously execute a maximum stroke travel of approximately 1 to 2 mm. The dimensions of the filter element 62 secure a positioning of the spherical closing element 61 relative to the opening 32. The filter element 62 can be positionable relative to the opening 32 by means of a detent, snap or clamping connection. Because of the filter element 62, only filtered fuel can reach the reserve pot 12. The sealing element 45 is advantageously formed directly onto the opening 32. A device for conveying fuel can thus be created that has a small number of components, thus providing economy in terms of production costs and assembly costs.

Figure 3:
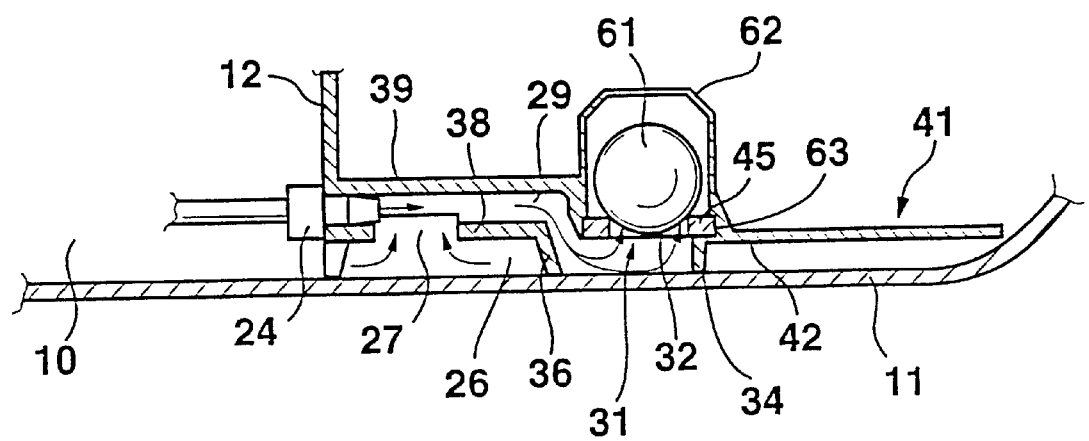
FIG. 3 is an enlarged, schematic, cutaway cross-sectional view of a further alternative version of FIG. 2.

An alternative version of FIG. 2 is shown in FIG. 3. Unlike FIG. 2, in this version the cage-like filter element 62 is embodied integrally with the bottom wall 39. Once again, it is provided that the filter element 62 filters fuel and positions the closing element relative to the opening 32. Once the closing element 61 is positioned in the filter element 62, a sealing element 45 is inserted into a receptacle 63 of the transitional region 31 and forms the opening 32. The sealing element 45 may be provided in the receptacle 63 via a simple detent, snap or clamping connection.

Suitable materials whose property and shape are unaffected by the fuel can be contemplated for the closing elements 44, 61 and filter elements 48, 62.

Because of the shallow, siphon-like arrangement and embodiment of the mixing region 29, it can be assured that upon an initial filling, which can encompass five liters of fuel, for instance, an inflow of fuel into the reserve pot 12 can be assured by the siphoning action. Later emptying can thus be prevented. As a result, with the present embodiments, an especially important customer demand can be met to satisfaction. Moreover, because of the small number of components, an economical arrangement with respect to production and assembly is provided, which moreover has a space-saving arrangement, as a result of which the tank contents can be greater, for the same tank volume.

What is claimed is:

1. A device for conveying fuel from a fuel tank (10) to an internal combustion engine (18) of a motor vehicle, said device comprising
   a reserve pot (12) accommodated in an interior of said fuel tank (10);
   a conveying unit (14), communicating, on an intake side, with said fuel tank (10) and, on a pressurized side, with said internal combustion engine (18);
   a jet pump (24) arranged near a tank bottom (11) of the fuel tank (10) and including means for pumping excess fuel into said reserve pot (12);
   a return line (22) for supplying the jet pump (24) with excess fuel from the internal combustion engine (18);
   a siphon-like mixing region (29) provided between the reserve pot (12) and the tank bottom (11), through which said jet pump supplies said excess fuel to said reserve pot (12), said siphon-like mixing region (29) having an opening (32) in a transitional region (31) leading to said reserve pot (12) and said opening (32) extending parallel to the tank bottom (11); and
   a closing element (44,61) for closing said opening (32), said closing element (44,61) being axially movable relative to the opening (32) in order to open said opening (32) for passage of said fuel through said opening into said reserve pot (12).

2. The device as defined in claim 1, further comprising a sealing element (45) for the closing element, said sealing element being arranged in said transitional region (31) and wherein said opening (32) is provided in said sealing element (45).

3. The device as defined in claim 1, further comprising a filter element (48,62) arranged in or on said opening (32) of said reserve pot (12).

4. The device as defined in claim 3, wherein said filter element is integrated in said opening (32).

5. The device as defined in claim 4, wherein said filter element (62) has a guide (46) and said closing element (44,61) is mushroom-shaped and provided with a protrusion (49) movable in said guide (46) of said filter element (62) in a direction of a longitudinal axis of said opening (32).

6. The device as defined in claim 4, wherein said closing element (61) is spherical and said filter element (62) is cage-like and surrounds said closing element (61) restricting motions of said closing element (61).

7. The device as defined in claim 6, wherein the reserve pot (12) has a bottom wall (39), the transitional region (31) of the siphon-like mixing region (29) has a receptacle (63) in which a sealing element (45) is held.

8. The device as defined in claim 6, wherein said filter element (62) is a separate part, whereby said filter element (62) is installed after said closing element (61) is arranged on said opening (32).

9. The device as defined in claim 7, wherein the siphon-like mixing region (29) has a partition (38) and a portion (41) of said bottom wall (39) of said reserve pot (12) is arranged in or below a plane (42) in which said partition (38) extends.

10. The device as defined in claim 1, wherein the fuel tank has a tank chamber (26) outside of, but adjacent to, said reserve pot (12), said tank chamber (26) is provided with an opening (27) to said siphon-like mixing region (29) and said jet pump (24) is disposed in the siphon-like mixing region (29) near said opening (27) of said tank chamber (26), whereby fresh fuel is drawn from said tank chamber (26) into said siphon-like mixing region (29).

11. A device for conveying fuel from a fuel tank (10) to an internal combustion engine (18) of a motor vehicle, said device comprising
    a reserve pot (12) accommodated in an interior of said fuel tank;
    a conveying unit (14) in said fuel tank (10), communicating, on an intake side, with said interior of said fuel tank (10) and, on a pressurized side, with said internal combustion engine (18);
    a jet pump (24) arranged near a tank bottom (11) of the fuel tank (10) and including means for pumping excess fuel into said reserve pot (12);
    a return line (22) for supplying the jet pump (24) with excess fuel from the internal combustion engine (18), said return line (22) being connected between the internal combustion engine (18) and said jet pump (24);
    a siphon-like mixing region (29) provided between the reserve pot (12) and the tank bottom (11), through which said jet pump supplies said excess fuel to said reserve pot (12), said siphon-like mixing region (29) having an integrated filter element (48) arranged in a transitional region (31) of the siphon-like mixing region leading to said reserve pot (12), said filter element (48) extending parallel to the tank bottom (11) and having a guide (46) therein; and
    a mushroom-shaped closing element (44) to prevent a return flow from the reserve pot (12) into the siphon-like mixing region, said closing element (44) comprising a cap (47) for closing the filter element (48) arranged in said reserve pot (12) above the filter element (48) and an axially extending protrusion (49) extending through said guide (46) of the filter element and connected to said cap (47), whereby said closing element is axially movable relative to the filter element (48) to uncover said filter element (48) so that a fuel flow through the filter element (48) from the siphon-like mixing region (29) occurs.

12. A device for conveying fuel from a fuel tank (10) to an internal combustion engine (18) of a motor vehicle, said device comprising
    a reserve pot (12) accommodated in an interior of said fuel tank;
    a conveying unit (14) in said fuel tank (10), communicating, on an intake side, with said interior of said fuel tank (10) and, on a pressurized side, with said internal combustion engine (18);
    a jet pump (24) arranged near a tank bottom (11) of the fuel tank (10) and including means for pumping excess fuel into said reserve pot (12);
    a return line (22) for supplying the jet pump (24) with excess fuel from the internal combustion engine (18), said return line (22) being connected between the internal combustion engine (18) and said jet pump (24);
    a siphon-like mixing region (29) provided between the reserve pot (12) and the tank bottom (11), through which said jet pump (24) supplies said excess fuel to said reserve pot (12), said siphon-like mixing region (29) is provided with an opening (32) arranged in a transitional region (31) of the siphon-like mixing region leading to said reserve pot (12), said opening (32) extending parallel to the tank bottom (11) therein;

a spherical closing element (61) for closing said opening (32) to prevent a return flow from the reserve pot (12) into the siphon-like mixing region; and a cage-like filter element (62) arranged in said reserve pot (12) over said spherical closing element (61) and said opening (32) to filter a fuel flow into the reserve pot (12), whereby said spherical closing element (61) is axially movable relative to the opening (32) so that the fuel flow into the reserve pot (12) from the siphon-like mixing region (29) occurs.

* * * * *